United States Patent [19]

Price

[11] 4,253,940
[45] Mar. 3, 1981

[54] METHOD AND APPARATUS FOR SEPARATING WASTE MATERIALS

[75] Inventor: Harold A. Price, Orange County, Calif.

[73] Assignee: Watson Energy Systems, Inc., Carson, Calif.

[21] Appl. No.: 77,981

[22] Filed: Sep. 24, 1979

[51] Int. Cl.³ .............................................. B07B 9/00
[52] U.S. Cl. ........................................ 209/3; 209/11; 209/134; 209/154; 241/23; 241/24; 241/DIG. 38
[58] Field of Search ............... 209/3, 11, 20, 132–137, 209/145, 146, 153, 154; 241/17, 19, 23, 24, 31, DIG. 38

[56] References Cited

U.S. PATENT DOCUMENTS

| | | | |
|---|---|---|---|
| 3,278,026 | 10/1966 | Bishard | 209/137 X |
| 3,610,594 | 10/1971 | Williams | 241/31 |
| 4,089,422 | 5/1978 | Harmke et al. | 209/137 |

FOREIGN PATENT DOCUMENTS

526238 10/1921 France ....................................... 209/137

Primary Examiner—Ralph J. Hill
Attorney, Agent, or Firm—George J. Netter

[57] ABSTRACT

Waste materials of varying density are passed through a hammer mill for size reduction after which they are moved along a gravity path within a stream of hot inert gas. The stream of materials is intercepted by a transversely moving mass of heated inert gas that separates the lighter materials from the heavier ones. A manifold receives the lighter materials while the heavier items are picked up at a lower position by a sealed screw conveyor. An adjustably located table and damper plate enable varying the weight-cut.

6 Claims, 14 Drawing Figures

METHOD AND APPARATUS FOR SEPARATING WASTE MATERIALS

The present invention relates generally to the separation of waste materials, and, more particularly, to a method and apparatus for separating conglomerate milled waste materials into different weight groups and dehydrating the same.

THE PRIOR ART

In the handling of waste materials preparatory to their disposal or being used as land fill, for example, an accepted treatment step is to pass the waste materials through a so-called hammer mill where they are shredded, broken and ground down to relatively small sized pieces. Such mills include pairs of closely spaced rotors between which the feed stock waste materials are passed for accomplishment of size reduction. Although these mills are excellent for reducing the size of particularly heavy waste materials, it is highly desirable to be able to separate the lighter waste materials from the heavy since processing, handling, transportation of the two is entirely different. Separation in the past has not been completely satisfactory for several reasons. Dehydration of the materials is most desirable and advantageous, but has not been accomplishable in the past while simultaneously separating the different waste materials.

In United States Pat. No. 3,833,117, Pneumatic Refuse Material Separation System, by H. B. MacKenzie et al, light and heavy constituents of refuse material are separated by delivering the conglomerate to the upper end of a vertically extending tube and as the material descends, an upwardly moving quantity of air separates the lighter constituents which are then drawn off above the discharge end of the inlet. The heavier constituents are collected at the lower end of the chamber. The patented system is relatively complex to build and operate, would to all appearances be relatively expensive, and dehydration would not be practical as a part of the described technique of separation.

OBJECTS AND SUMMARY

It is a primary object of the present invention to provide an improved method and apparatus for separating heavy and light waste materials after they have been milled.

Another object is the provision of a method and apparatus for separating waste materials in a manner reducing the possibility of fire or explosion.

A further object is the provision of such a method and apparatus in which the milled waste materials are simultaneously separated and dehydrated.

Yet another object is the provision of method and apparatus as in the previous objects in which the weight criterion of separation is selectively variable.

In the practice of the present invention, conglomerate waste materials having constituents of varying weights and sizes are passed through a hammer mill where they are reduced in size. The milled materials are then moved along a gravity path within a stream of hot inert gas along which path they are intercepted by a transversely moving mass of heated inert air that separates the lighter materials from the heavier ones. A horizontally extending manifold receives the lighter materials while the heavier items continue falling and are picked up at a lower position by a sealed screw conveyor. Adjustable vanes enable varying the amount and direction of the separating gas stream. The first mentioned hot gas stream simultaneously removes moisture from the materials reducing their weight and thereby making them more efficiently separated and obviating clumping which deters separation.

In a further aspect of the invention, an air table is adjustably positionable to extend from the light-fraction manifold into the region of material separation. Streams of heated air are directed from the table upwardly to guide the waste materials. Location of the table determines the cut point between the light/heavy fractions of waste materials.

DESCRIPTION OF A PREFERRED EMBODIMENT

Figure 1:
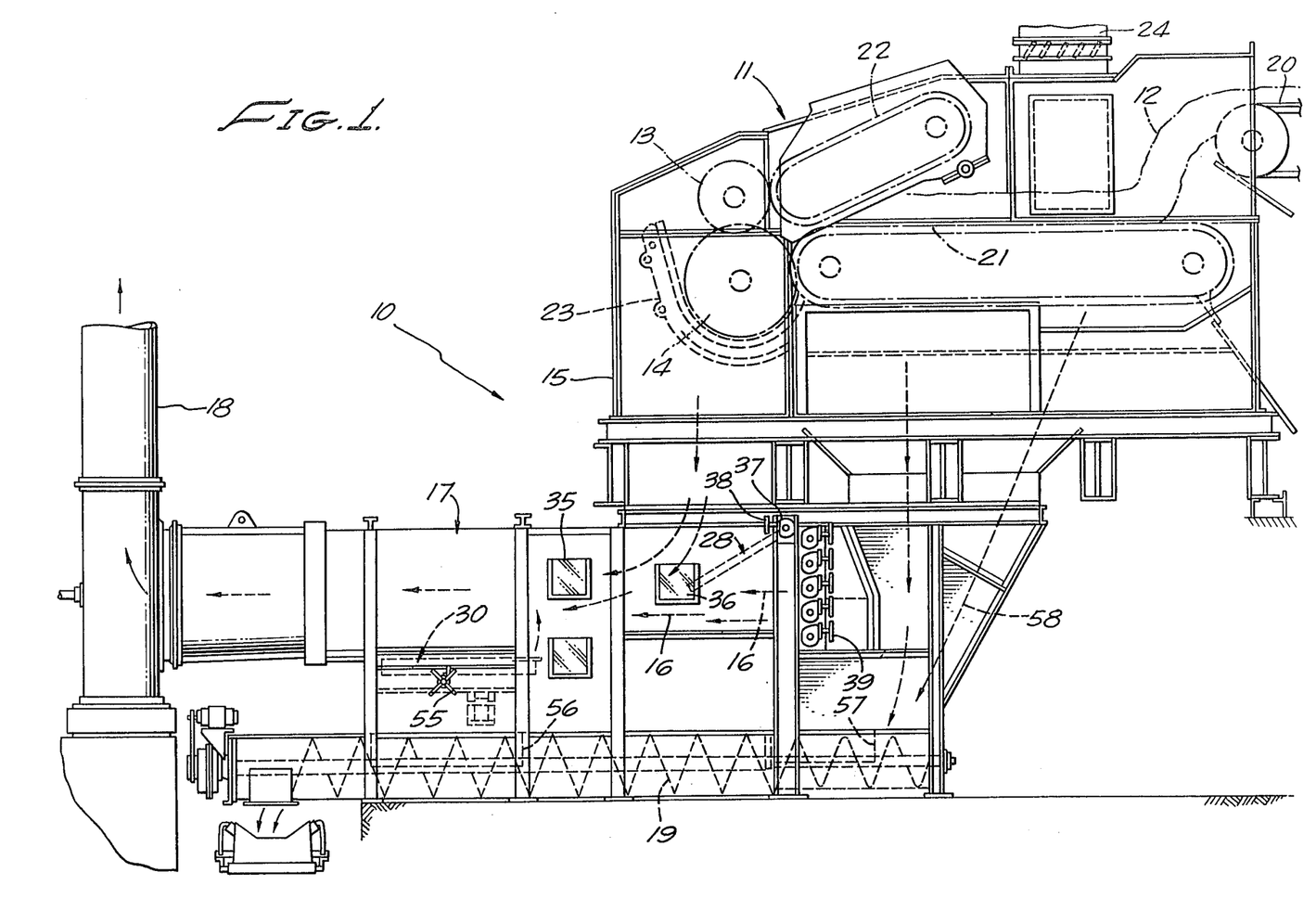
FIG. 1 is a sectional, elevational view, partially schematic, of the separation apparatus of this invention.

Turning now to FIG. 1 of the drawings, there is disclosed in elevational view a waste material separation unit and hammer mill designated generally as at 10 which, in a way that would be more particularly described, reduces the size of conglomerate waste materials (i.e., metal as well as light paper and plastic items) and separates them into light and heavy fractions. In its major elements, the separator system is seen to include a hammer mill 11 which reduces a stock of waste materials 12 into small-sized pieces by grinding them between a pair of rotating rollers 13 and 14 and forcing them through a sizing grate 23. The milled materials are carried within a hot inert gas stream along a gravity path through manifold 15 in the lower reaches of which they encounter a generally horizontally directed stream 16 of hot gases or air. The horizontally moving hot gases act on the lighter weight waste materials deflecting them into a manifold 17 for eventual removal via an interconnecting conduit 18. The heavier items (e.g., metal, glass) will be only slightly affected by the horizontal hot gas stream 16 and, therefore, fall onto a screw conveyor 19 for removal.

The hammer mill 11 is of conventional construction and includes a belt conveyor 20 which brings a continuous quantity of conglomerate waste materials from an external point to the system and delivers it onto the upper surface of a second belt conveyor 21. A third belt conveyor 22 is arranged angularly with respect to the conveyor 21 and serves to compress the materials 12 before they are introduced between the mill star wheel 13 and an arbor on which are mounted swinging hammers, the latter identified generally at 14, which operate in a known way to reduce the size of the materials. A sizing grate 23 is located in spaced surrounding relationship to the lower hammer arbor 14 and through which the milled waste materials pass for size control after which they move along a gravity path within manifold 15 immediately prior to separation. The upper star wheel 13 has a relatively small diameter and rotates slowly (approximately 10 rpm) holding the waste materials, whereas the lower or larger diameter arbor mounted hammers 14 rotate at much greater rate (approximately 900 rpm), the difference in rotation rates serving to enhance the milling effect and forcing the milled stock through the grate 23. Heavy solids and metals have been found to exit the grate 23 at speeds approximately 12,000 feet per minute, while paper and thin plastics will explode upon moving through and reach much lower speeds, namely, in the range of about 700 feet per minute.

The hammer mill 11 and associated belt conveyors 21 and 22 are located within a closed housing provided with a low oxygen containing heated gas (60000–64000 cubic feet per minute at 400° F.) via a conduit 24 dehydrating the waste materials both prior to and during the milling. In this manner a negative pressure is maintained in the manifold 15 and hammer mill area which prevents dusting that has caused so many fires in other similar types of equipment.

Figure 14:
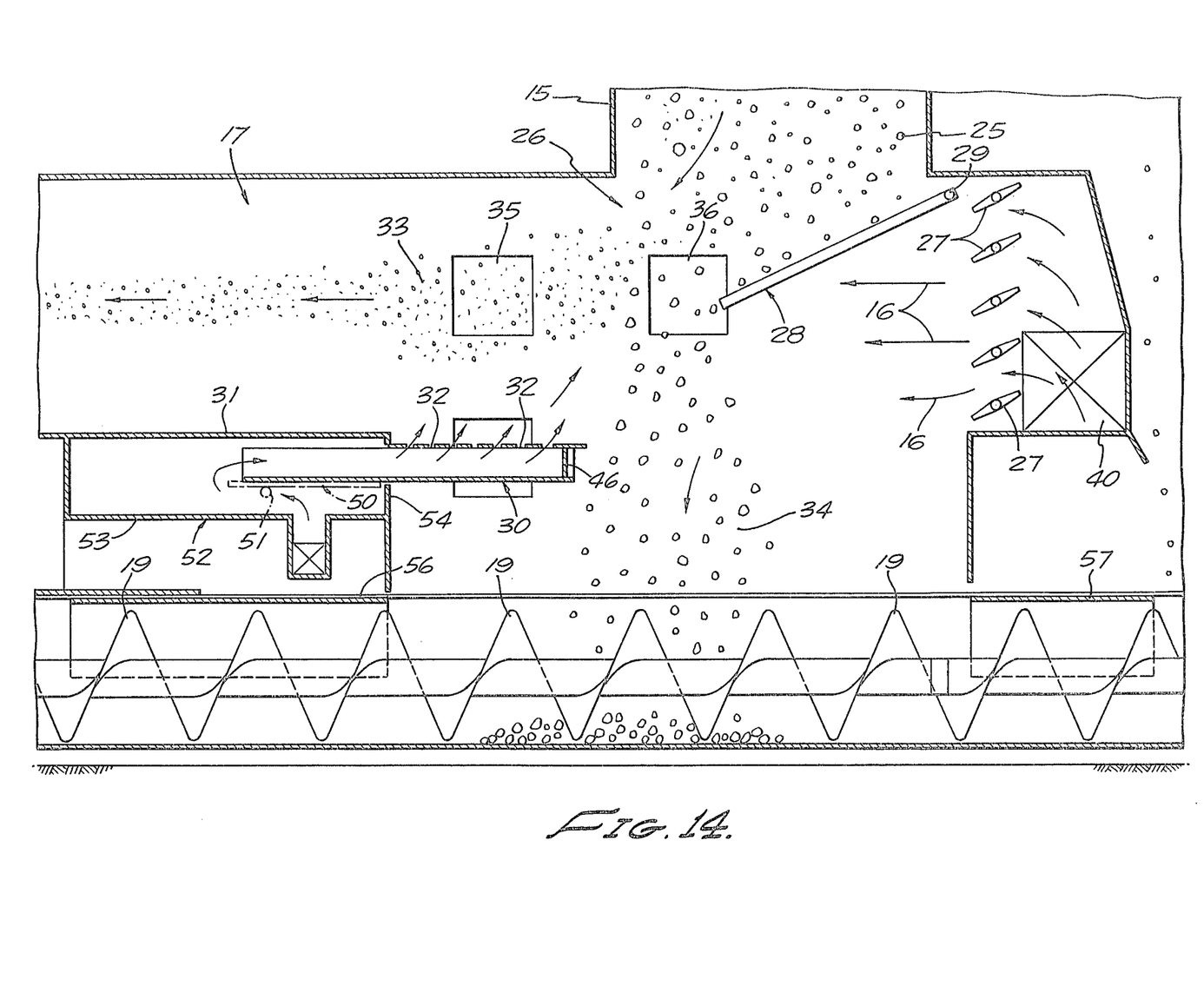
FIG. 14 is an elevational view of the separation apparatus of this invention showing action on conglomerate waste received from a mill.

For the ensuing detailed description of the material separation process, reference is now made to FIG. 14. As shown there, the downwardly moving milled materials, referenced generally as at 25, enter a chamber 26 where separation is accomplished. The horizontally emitted stream 16 of heated gas is controlled by a plurality of adjustable vanes 27, just inwardly of which is located a damper plate 28. The damper plate is pivotally adjustable about an axle 29 from a position substantially closing off heated gases from the separation chamber, to one of substantially completely open condition.

As the milled waste materials 25 entrained within the hot gas from 24 move downwardly and out of manifold 15, they encounter the heated horizontally moving gas 16 which pressures the lighter materials into the horizontal manifold 17. At the same time since the horizontal gas stream has lesser effect on the heavier materials, they will continue falling until received in a screw conveyor 19.

A horizontally positionable air table 30 is received within the lower wall 31 of manifold 17 and is selectively extendable horizontally into and out of the separation chamber. A supply of heated gas, (arrows) is provided to the air table which exits through a plurality of openings 32 in the top of the table and is directed generally upwardly through the mass of light materials 33. Depending upon the adjustment of the table 30 more or less air is directed upwardly thereby controlling flow of the light fraction through the manifold as well as serving to direct some of the heavy fraction back into the main stream 34 thereby enhancing separation of materials. In addition, the degree of physical extension into the separation chamber affects the "weight cut" or point of weight separation for the system.

First and second windows 35 and 36 are located in the side wall of the separation chamber 26 and manifold 17, permitting view by an externally located operator of the separation operation. Preferably these windows are made of a safety glass and are readily removable for cleaning and replacement.

With respect to the theoretical aspects of separation achieved in the described manner, several conditions significantly affect the operation. For example, the volume of the chamber 26 within which separation occurs is an important factor. Also, the size of the milled particles is important, and of course, the velocity of the horizontal air stream 16. In a practical construction of the invention, the separation chamber was approximately 5.75 feet wide by 5.5 feet high and 5.0 feet deep. It has been found in testing a system having a separation chamber of the defined dimensions and where the light fraction materials were moving through the hammer mill grate at a velocity of about 700 feet per minute, that the velocity of gases 16 must be maintained at approximately 1,060 feet per minute. In that case, heavy particles or the heavy fraction moving with an initial velocity already indicate of about 12,000 feet per minute on encountering the horizontal air stream 16 moving at 1,060 feet per minute, suffers only a small displacement of about 0.48 feet. The lighter materials, on the other hand, will be substantially deflected and move along a curved path into the manifold 17 thereby achieving the desired separation.

With respect to milled wastes of a particle size from 1/16 to 3/16 of an inch and having a density of less than 1, these are easily carried across the width of the separation chamber by the horizontal hot gas stream whereas those wastes of greater particle dimensions and density fall straight through the chamber 26 and are collected by the screw conveyor.

Figure 2:
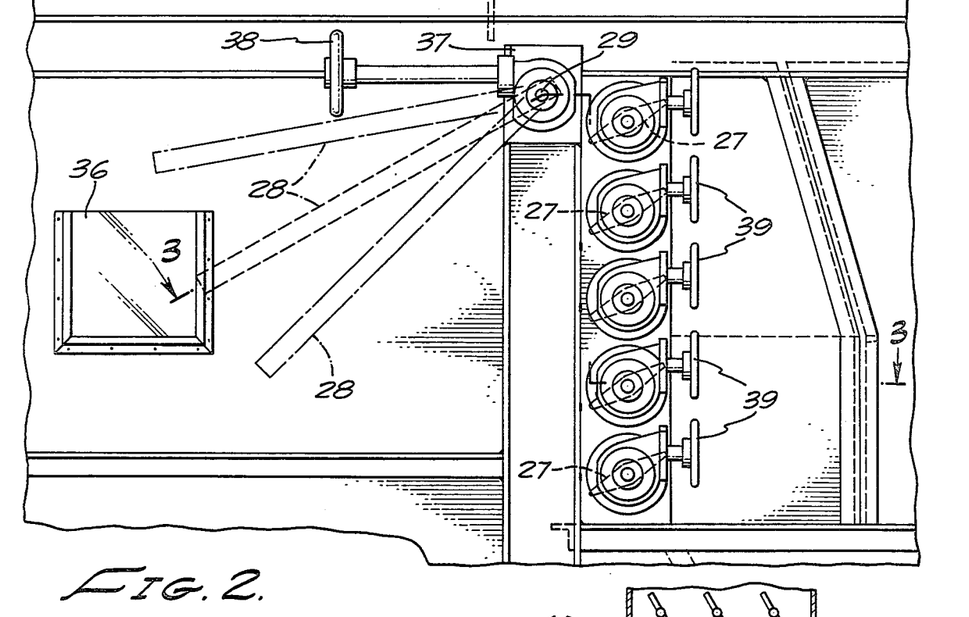
FIG. 2 is an enlarged, sectional elevational view of the separation chamber.
Figure 3:
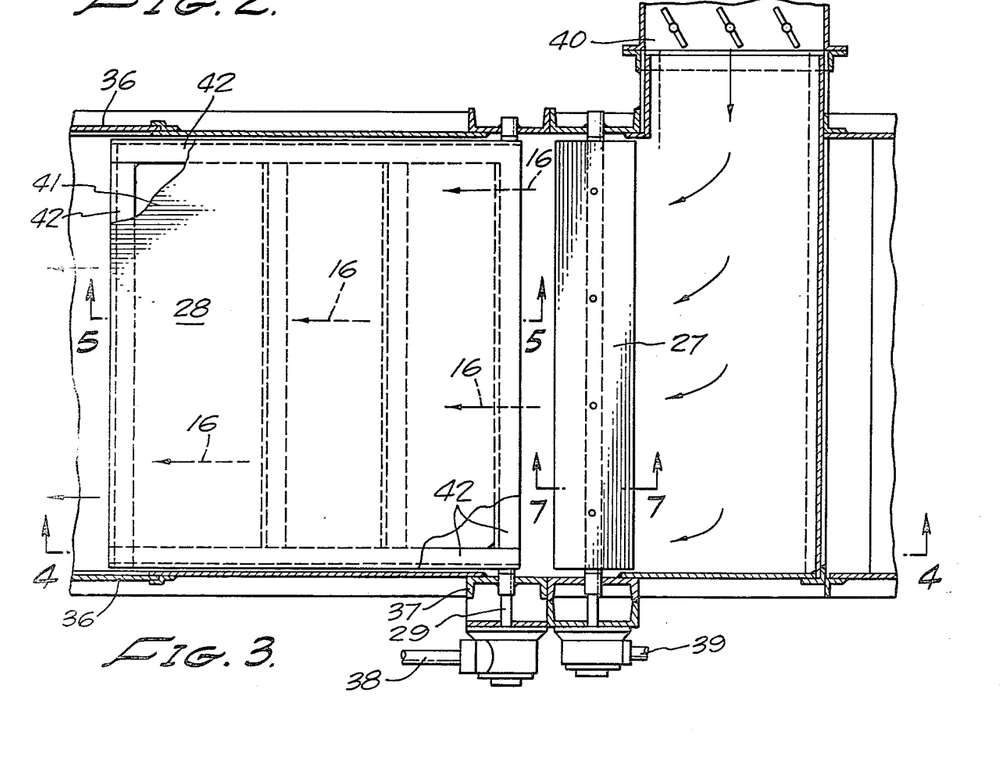
FIG. 3 is a vertical sectional view taken along the line 3—3 of FIG. 2.
Figure 4:
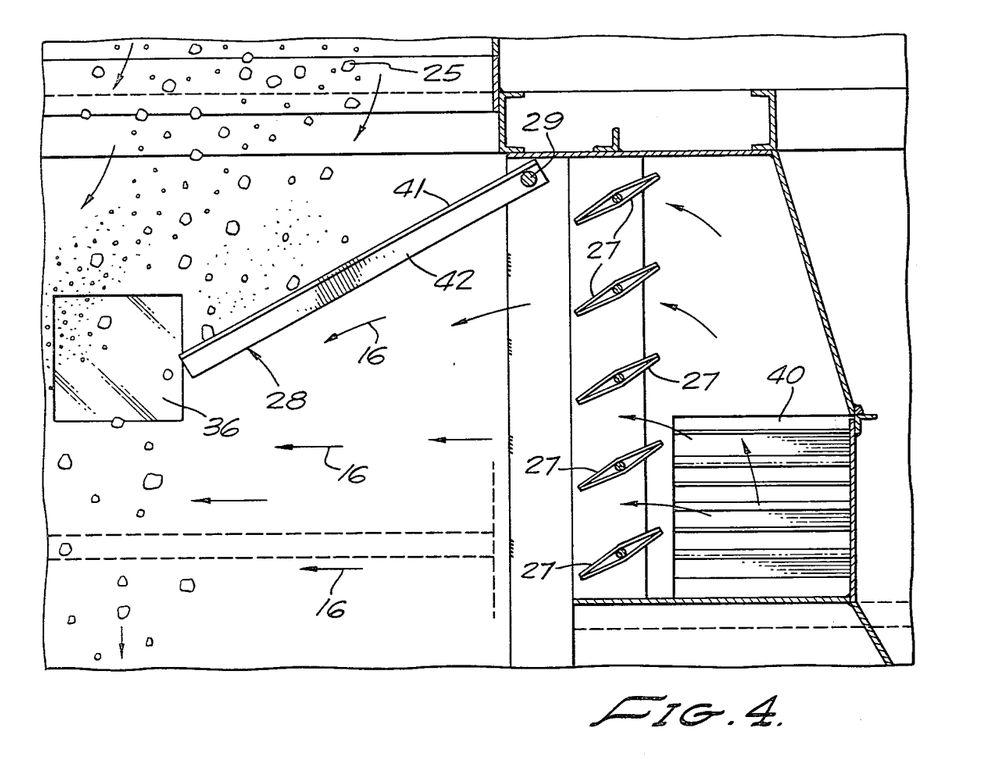
FIG. 4 is a side elevational sectional view taken along 4—4 of FIG. 3.

As can be seen best in FIGS. 2 and 3, the damper plate 28 is affixed to an axle rod 29 passing through the plate and lying in the plane thereof along one edge, which is interconnected to a suitable journal 37 in the wall member with a hand operated adjustment wheel 38 located outwardly of the system and closely adjacent the window 36. Similarly, the vanes 27 are independently controlled and positioned by a plurality of respectively individual manually operated means 39 thereby controlling the direction and flow of hot gases (arrows in FIGS. 3 and 4) supplied via a flow damper 40. Both of the means 38 and 39 are closely adjacent the window 36 so that the operator may effect adjustments while at the same time view internal operation through the window.

It is not contemplated that continual or even frequent adjustments of the setting of the vanes and damper plate are required unless there are substantial feed stock changes. Moreover, in the usual case, the operator when setting up the equipment and initiating its operation, will make only one set of adjustments and little if any attention will be required thereafter, other than occasional viewing through the window to assure satisfactory operation.

Figure 5:
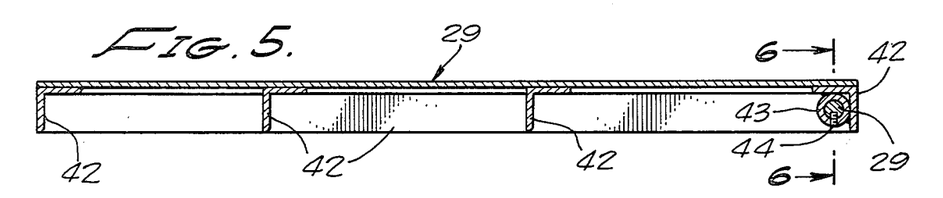
FIG. 5 is a further side elevational view taken along the line 5—5 of FIG. 3.
Figure 6:
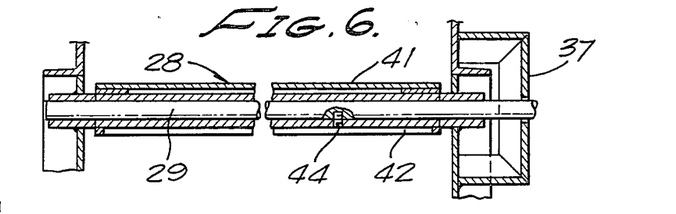
FIG. 6 is an end elevational view taken along the line 6—6 of FIG. 5.
Figure 7:
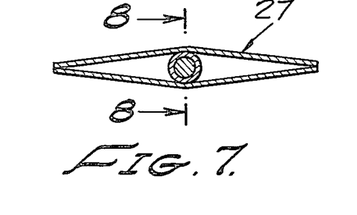
FIG. 7 is a side elevational, slightly enlarged view taken along the line 7—7 of FIG. 3 through an air vane.
Figure 8:
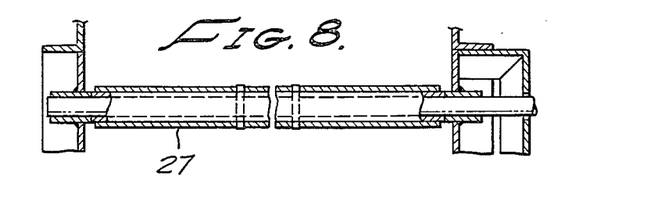
FIG. 8 is an end elevational sectional view taken along the line 8—8 of FIG. 7.

As can be seen best by comparison of FIGS. 3, 5 and 6, the damper plate includes a rectangular metal sheet 41 having a support frame constructed of angles 42 welded to the sheet edge margin and extending transversely thereof. A tube 43 welded within an edge angle has the axle 29 pinned therein as at 44.

Figure 12:
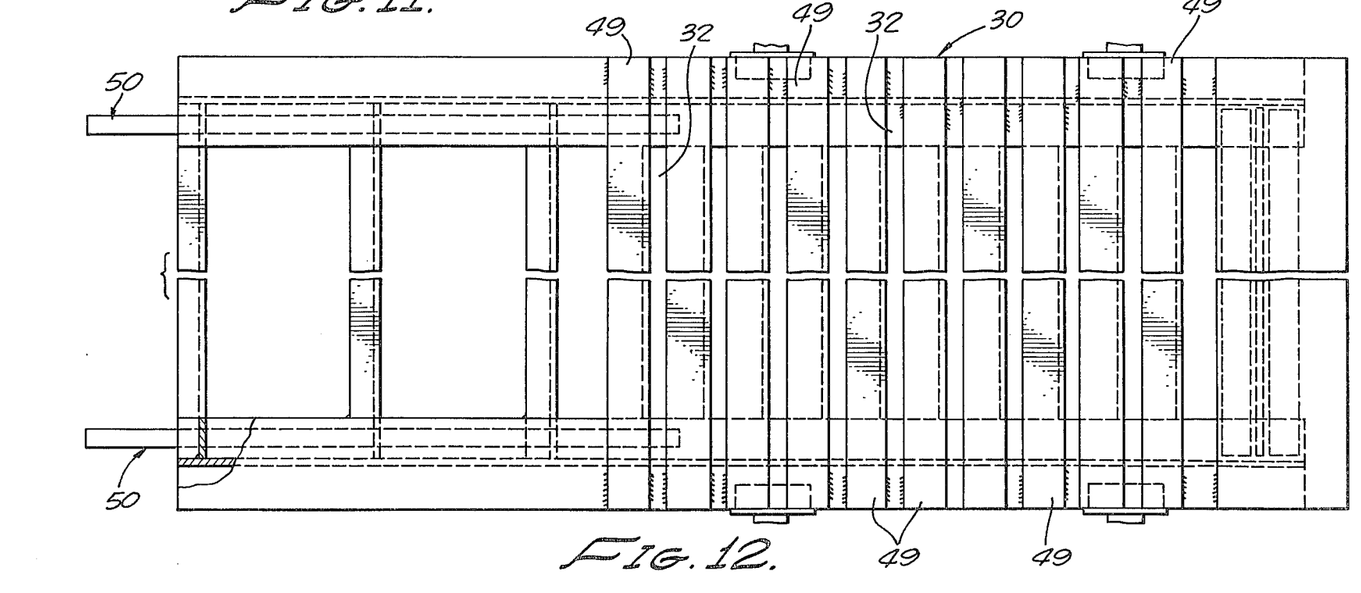
FIG. 12 is a vertical plan view taken along the line 12—12 of FIG. 11.
Figure 13:
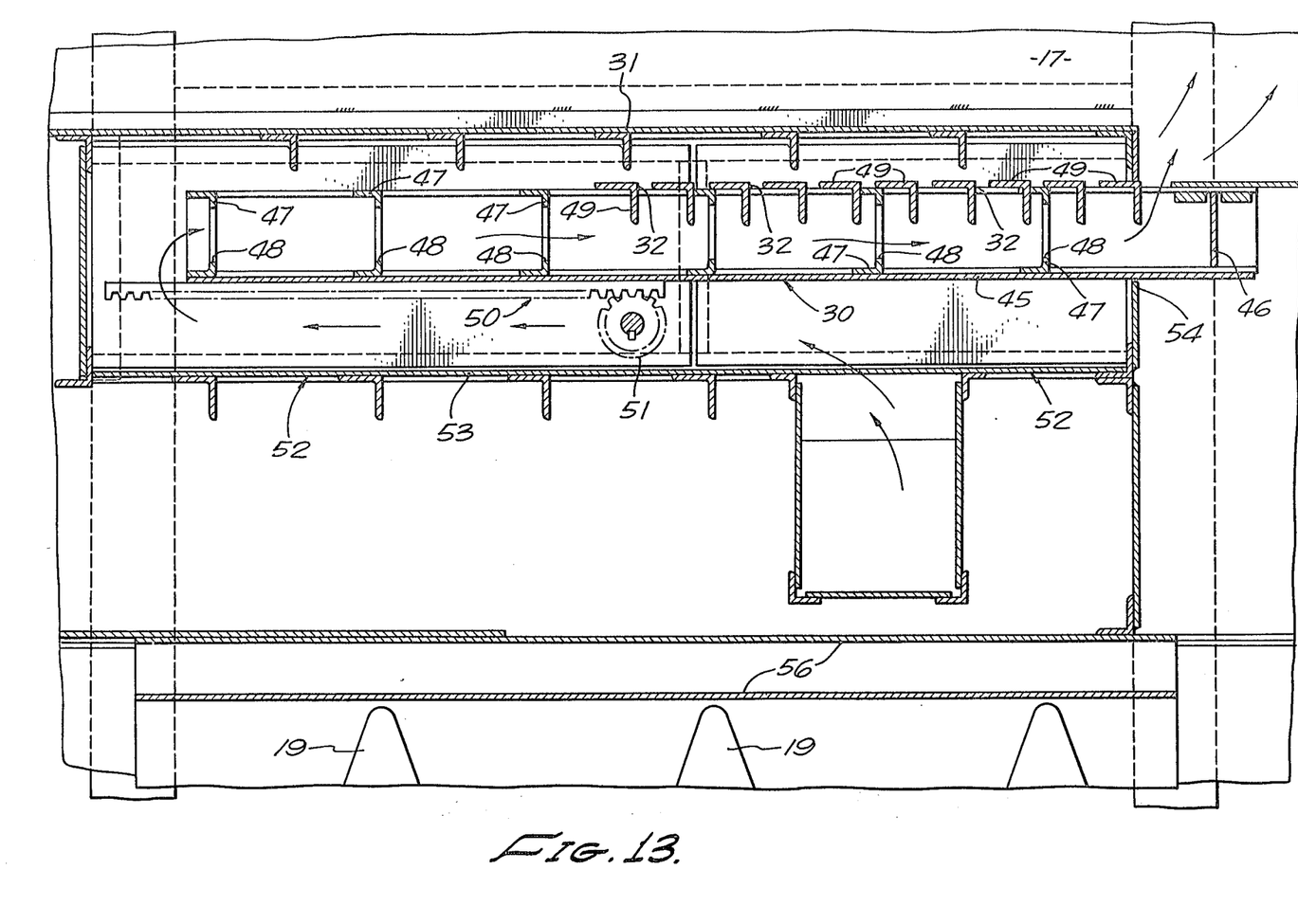
FIG. 13 is a sectional elevational view similar to FIG. 11 showing the movement of air therethrough.

With respect now particularly to FIGS. 12 and 13, the air table 30 is seen to include a platelike base 45 with walls closing both sides and an imperforate front wall seal 46. A plurality of angle struts 47 extend transversely across the plate and each includes an opening 48 therethrough. A plurality of mutually spaced angles 49 defining slots therebetween have their ends affixed to the table side walls collectively forming a slotted top wall.

Figure 9:
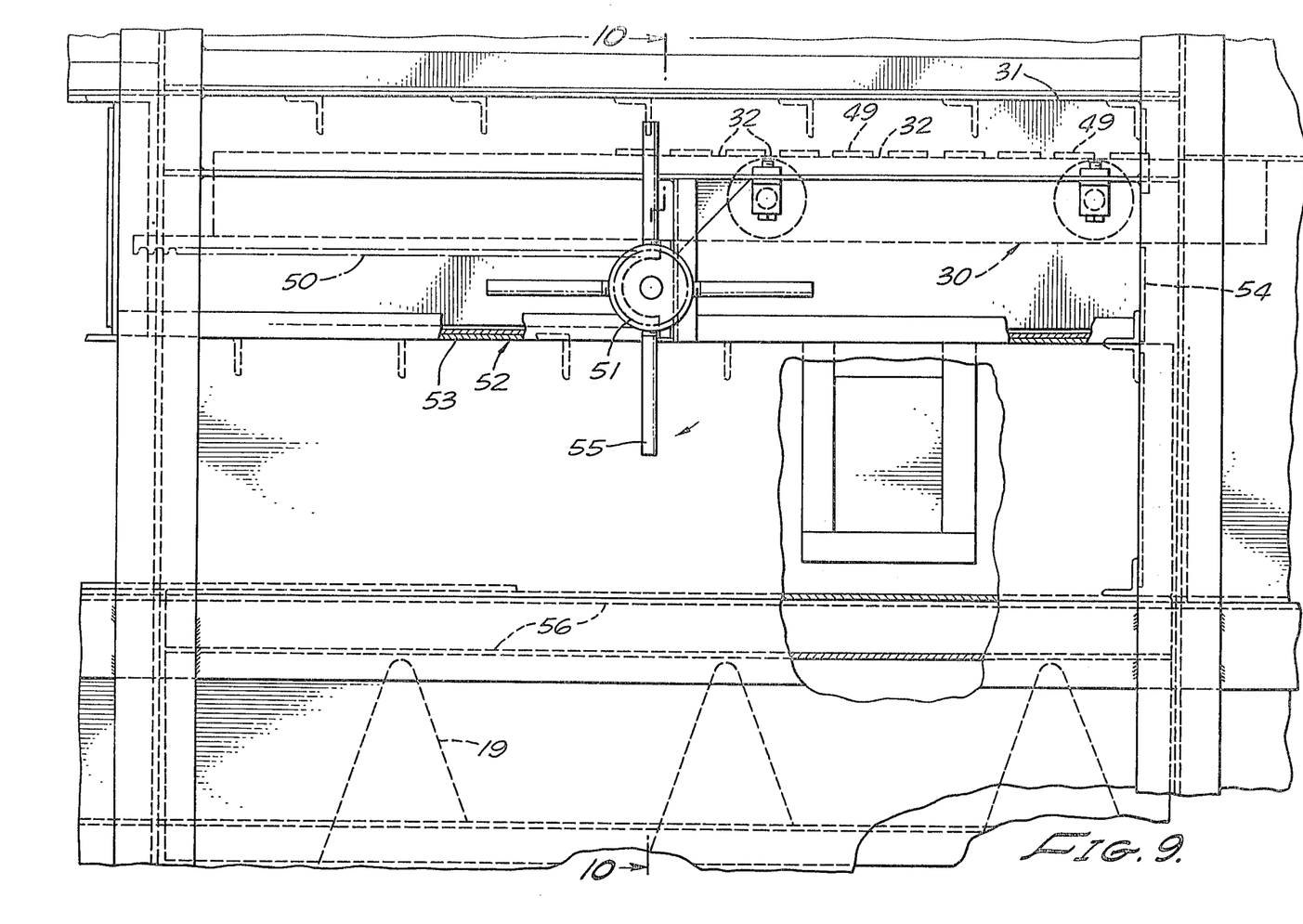
FIG. 9 is an enlarged sectional partially fragmentary view of a separation air table of the invention.
Figure 10:
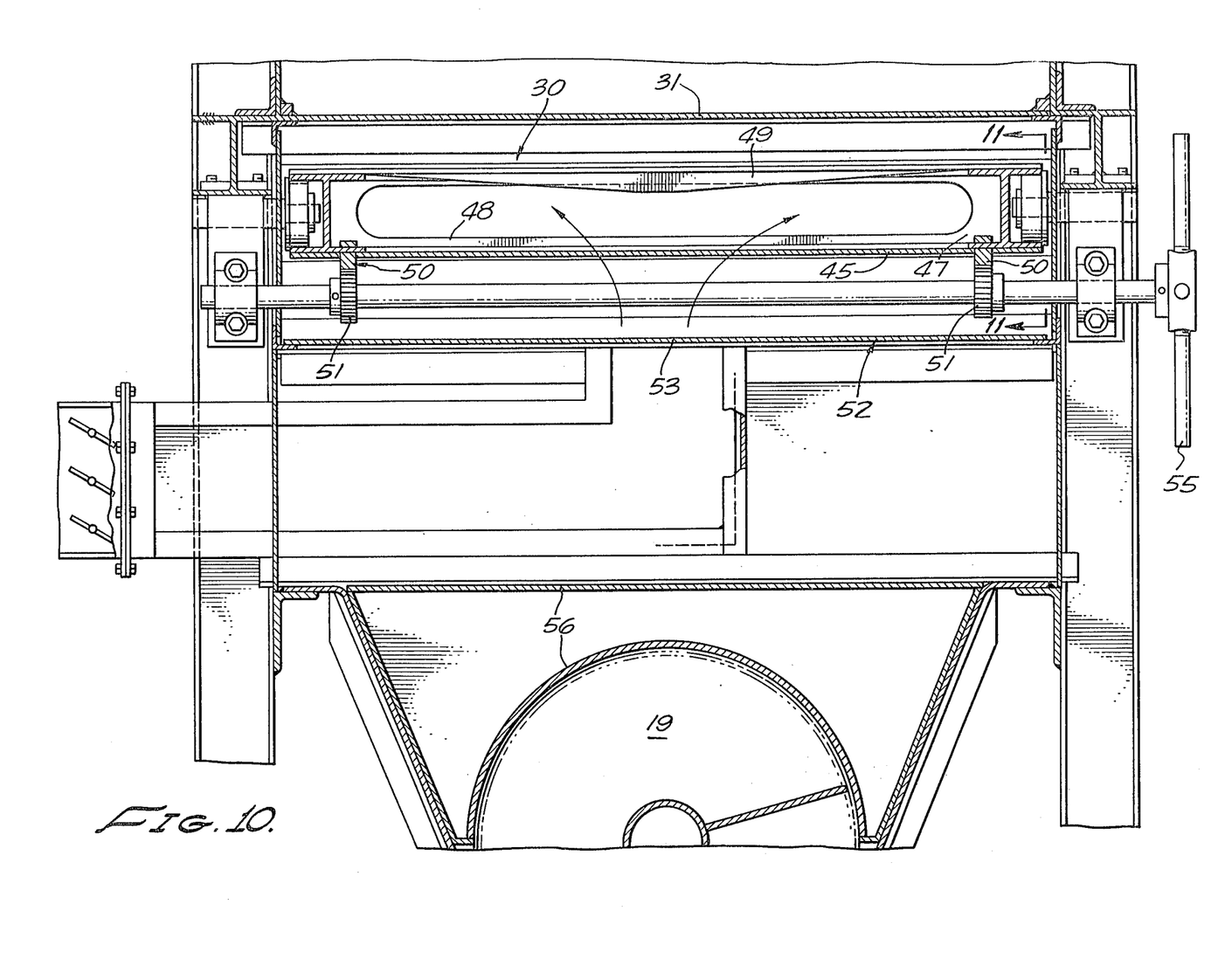
FIG. 10 is an end elevational sectional view taken along the line 10—10 of FIG. 9.
Figure 11:
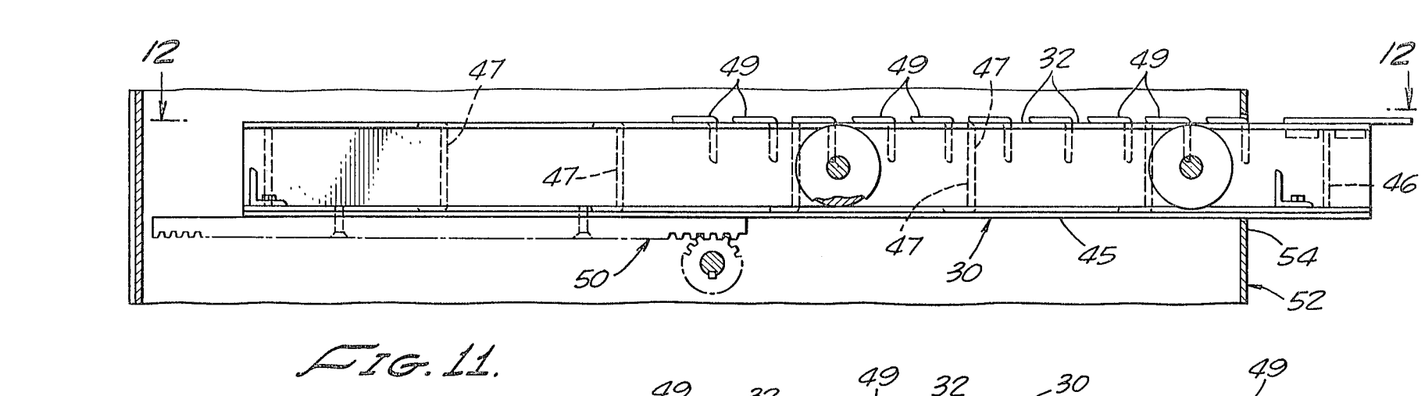
FIG. 11 is an end elevational view taken along the line 11—11 of FIG. 10.

The table 30 also includes a rack 50 on the bottom plate 45 which coacts with a gear 51 in a known way. The entire table, rack and gear are located within a manifold 52 formed by bottom wall 53, the bottom wall 31 of manifold 17, side and front walls. The front wall 54 has an opening through which the table may be selectively extended. The interior of the manifold 52 communicates with a source of heated gas (arrows) which passes through the openings 48 in struts 47 to exit via the spaces between the angles 49 that lie outwardly of the manifold 52 with the seal 46 insuring this flow. Adjustment of the table extension is effected by rotation of the handwheel 55 (FIG. 9) which drives the gear 51 against the rack 50.

Returning to FIGS. 1, 9, 10, 13 and 14, it is to be noted that the screw conveyor 19 includes shroud seal means at 56 and 57 preventing the pressurized gases at interior of the described apparatus from leaking out along the conveyor which would reduce efficiency of operation if not defeat successful operation completely.

As best seen in FIG. 1, a certain amount of dust, debris and the like drops from the hammer-mill conveyor 21 as indicated by the dashed-line arrows 58 and are also picked up by the screw conveyor 19 for removal to a remote disposal point.

Although the invention has been described herein particularly for use in the separation of waste materials, it is believed to have a much greater range of applicability. For example, separation of grain from their husks or hulls may be advantageously accomplished through the practice of this invention. In fact, it is believed that conglomerate materials of great variety may be separated in this way, wherever the component materials differ substantially in size, density or weight.

What I claim is:

1. Apparatus for separating and dehydrating conglomerate materials into differing density groups, comprising:
   walls defining a first vertically extending manifold;
   means for moving a quantity of inert heated gas downwardly through said first manifold;
   means for entraining the conglomerate materials in the gas moving downwardly through said first manifold;
   walls defining a separating chamber in communication with the lower end of said first manifold;
   walls defining a second manifold extending generally horizontally from and in communication with the separating chamber;
   a damper plate affixed to a wall of said separating chamber and located opposite said second manifold and obstructingly partially extending into the downwardly moving materials;
   means for directing a second quantity of gas transversely of said first downwardly moving gas across said separating chamber into said second manifold; and
   a table interconnected with a lower wall of said second manifold adjustable for selective and variable extension into the separation chamber.

2. Apparatus as in claim 1, in which said table includes means for directing upwardly moving gas therefrom.

3. Apparatus as in claim 1, in which said damper plate is selectively adjustable about a transverse axis changing both the angular disposition and extension into the separation chamber.

4. Apparatus as in claim 1, in which window means are provided in the separation chamber and second manifold walls for viewing operation.

5. Apparatus as in claim 1, in which means are provided for reducing the size of the conglomerate materials prior to their being entrained in the downwardly moving gas.

6. Apparatus as in claim 1, in which there are further provided selectively adjustable vane means mounted in a wall of the separating chamber for controlling the amount and direction of movement of the second gas.

* * * * *